Oct. 21, 1958

A. E. CUTLER 2,856,702

GUNNERY TRAINING APPARATUS

Filed Sept. 22, 1954

INVENTOR
Albert Ernest Cutler
BY George Hadley
ATTORNEY

United States Patent Office 2,856,702
Patented Oct. 21, 1958

2,856,702

GUNNERY TRAINING APPARATUS

Albert Ernest Cutler, Crawley, England, assignor to Communications Patents Limited Application September 22, 1954, Serial No. 457,691

Claims priority, application Great Britain October 1, 1953

11 Claims. (Cl. 35—25)

This invention relates to gunnery training apparatus and has for its object to provide novel apparatus of this kind whereby a record of the effectiveness of a pupil's simulated gun fire is obtained.

According to one aspect of the invention, a gunnery training apparatus includes means for obtaining from a source of light a plurality of angularly displaced flashes of light which is representative of the angular spread of bullets from a gun, a target, light-sensitive means arranged to be responsive to those flashes of light which reach the target, and means under the control of said light-sensitive means to register the flashes of light which reach the target.

According to another aspect of the invention, a gunnery training apparatus includes means for obtaining from a source of light a succession of flashes of light which are angularly displaced one to another in a manner representative of the angular dispersion of a succession of bullets from a gun, a target, and means operative to obtain a count of the number of such light flashes which reach the target.

According to a particular feature of the invention, the apparatus comprises means for obtaining relative movement of the target and the means serving to produce the flashes of light, whereby the relative manoeuvring of a gun and a target can be simulated.

Figure 1:
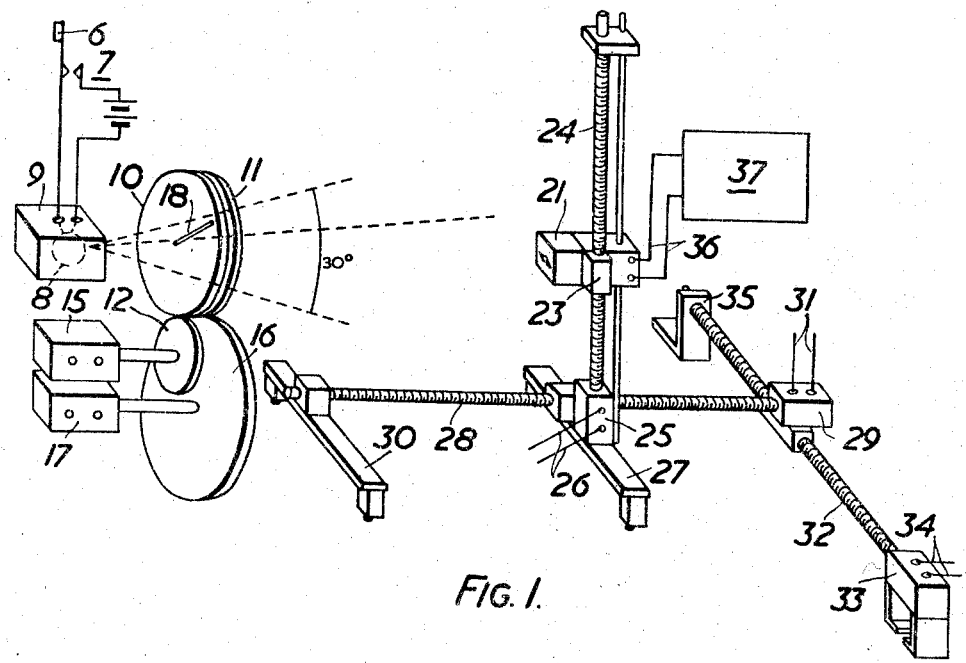
Figure 2:
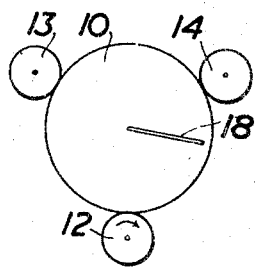
Figure 3:
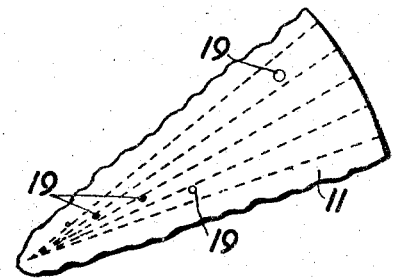
Figure 4:
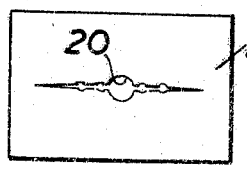
Figure 5:
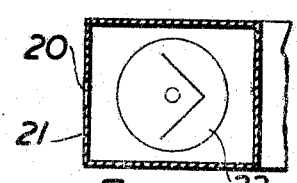

The invention will now be described, by way of example only, with reference to the accompanying drawings in which Figure 1 shows, diagrammatically, a gunnery training apparatus according to one embodiment of the invention, Figure 2 is a detailed view illustrating the support and driving of a first rotary disc in the apparatus of Figure 1, Figure 3 shows a portion of a second rotary disc in the apparatus of Figure 1, Figure 4 shows a front view of a target box included in Figure 1, and Figure 5 is a cross sectional view of the target box shown in Figure 4.

For the purpose of this description, it will be assumed that the training which is to be carried out with the aid of the apparatus pertains to the firing of an automatic repeating gun from an aircraft in which the gunner obtains a view of a target aircraft by means of radar.

This particular apparatus includes a simulation gun button 6 whereby a pupil gunner can introduce the firing by closing a switch 7 and thus energising an electric lamp 8 which is arranged within a housing 9 to project a beam of light of 30° aperture on to the first of two rotatable discs 10 and 11. The disc 10 is supported at its edge by three equally spaced discs 12, 13 and 14, as shown in Figure 2. The disc 12 is driven by an electric motor 15 and provides an edge drive for the disc 10. A similar supporting arrangement is provided in respect of the disc 11 but only a driving disc 16 of this arrangement is shown in the drawing, this latter disc being driven by an electric motor 17. The motors 15 and 17 are operated at speeds such that the discs 10 and 11 are driven at different rates and, advantageously, these rates are variable by suitably adjusting the energising circuits of the motors.

The disc 10 has a radially extending slit 18 which allows light from the lamp 8 to reach the disc 11. The latter is traversed by a number of holes 19 which are located at spaced apart positions in a manner corresponding to the normal distribution law for bullets and, during the rotation of the discs 10 and 11, these holes come into alignment momentarily with the slit 18 to produce a succession of flashes of light, the direction of these flashes being determined by the positions of the holes. The rotation of both of the discs 10 and 11 ensures that the flashes of light from any one hole of the series of holes do not occur in the same direction each time.

The target of this apparatus is representative of a profile of a target aircraft and consists of an aperture 20 in one wall of a box 21 which accommodates a photo electric cell 22. This target box forms part of a carriage 23 which is mounted on a vertical lead-screw 24 so that, when the latter is rotated by an integrator motor 25, the target box is raised or lowered and for this purpose the motor 25 has to be supplied, by way of wires 26, with electric signals which are representative of the angle of elevation of the target aircraft from the transverse plane of the gunner's aircraft.

The integrator motor 25 is fixed to a movable frame 27 which is mounted on a lead-screw 28 adapted to be driven by an integrator motor 29 and the end of this lead-screw remote from the motor 29 is supported in a movable frame 30. The motor 29 has to be supplied, by way of the wires 31, with electric signals which are representative of the speed of the target aircraft in a horizontal direction, for example a north-south direction, so that the vertical lead-screw 24 and consequently the target 20 are displaced in a direction parallel with the axis of the lead-screw 28.

The integrator motor 29 is mounted on a further lead-screw 32 which is driven by an integrator motor 33 to which there has to be supplied, by way of wires 34, electric signals which are representative of the angle of train of the target aircraft from the vertical plane of symmetry of the gunner's aircraft. The motor 33 is fixed and the end of the lead-screw 32 which is remote from this motor is mounted in a fixed bearing 35. Rotation of the shaft 32 serves to carry the assembly comprising the motor 29, the lead-screw 28, the frames 27 and 30, the lead-screw 24, and the target 20, in a direction parallel with the axis of said lead-screw 32.

By reason of this arrangement the target 20 can be moved in any direction to simulate the movement of a target aircraft.

In real gun fire, the probability of occurrence of directions of flight of the bullets decreases rapidly with the error angle so that most of the bullets (e. g. about 99% of bore-sighted bullets) fall inside a cone of angular subtent about 2 minutes. This cone of fire is extremely narrow and in the training apparatus shown, transverse distances are expanded by a factor of 450, so that a corresponding cone has an aperture of 15°. The apparatus is in fact designed to permit an aperture of 30°, representing a real cone of about 4 minutes angular subtent.

In view of this expansion of the cone of fire, the scale movements of the target in transverse directions, that is to say in directions parallel to the lead-screws 24 and 32, also are increased in the ratio of 450:1.

The apparent cone of fire can be further expanded (for example from 4 minutes to 8 minutes) by decreasing the scale of movement along the lead-screw 28, that is to say by bringing the target 20 nearer to the discs 10 and 11 or decreasing transverse movements of the target.

Assuming the apparatus to be energised, the motors 15 and 17 imparting continuous rotation to the discs 10 and 11, simulation of gun fire is obtained whenever a pupil gunner operates the gun button 6 to energise the lamp 8 and causes the apertured discs 10 and 11 to produce a succession of flashes of light. When the target 20 occupies a position within the cone of fire and such a flash is effective to operate the photo electric cell 22 in the target box, that is to say when such a flash reaches the target, the pulse of current produced in the cell 22 is transmitted, by way of wires 36, to a suitable pulse-counting device 37, which for example, might comprise a dekatron counter tube and an amplifier which causes all the pulses to have the same amplitude.

The signals supplied to the integrator motors 25, 29 and 33 can be under the control of an instructor in charge of the apparatus, thus enabling the instructor to impose personal supervision over the manoeuvring of the target. In such a case, if the instructor decides that, as a result of the count obtained by the counter 37 the pupil gunner has made sufficient hits to warrant the destruction of a target aircraft, he can manoeuvre the target out of the cone of fire, for example downwardly.

In some cases the control of the signals being applied to the integrator motors 25, 29 and 33 can be arranged under the control of means for carrying out automatically a predetermined training programme, that is to say a predetermined manoeuvring of the target 20.

It is preferable that the rate of the flashes of light is greater than the assumed rate of firing, for example ten times as great, by suitably driving the discs 10 and 11, as without this provision, a very short burst of fire might result in a number of flashes of light in a sector of small angular subtent. When this high rate of light flashes is adopted, means can be included in association with the pulse counter to reduce the actual count appropriately.

Means can be provided for automatically switching off the counter when the range of the target is greater than the usually effective range of gunfire.

Automatic stop and reversing arrangements can be provided to prohibit relative ranges of less than a predetermined value and to reset the target out of range ready for the next approach.

For the purpose of providing a pupil gunner with a radar picture of his target, the electric signals applied to the motors 25, 29 and 33 for the purpose of manoeuvring the target 20 can be employed to operate or control a suitable radar display equipment.

What I claim is:

1. A gunnery training apparatus comprising means capable of producing in a given direction of fire a succession of light flashes projected in directions defining a conical zone, the axis of which coincides with the direction of fire and in which the light flashes are at different radial distances from such axis in a manner representative of the angular dispersion of a succession of bullets from a gun pointed in such direction of fire, a target, and light-sensitive means responsive to the light flashes reaching the target, and means controlled by said responsive means to cause a count of the number of such light flashes.

2. A gunnery training apparatus as claimed in claim 1 wherein said target comprises a box having in a wall thereof a light-permeable aperture having a configuration representative of the profile of the object under fire and wherein said light-sensitive means is a light-sensitive cell arranged in said box behind said wall, whereby said cell is responsive to the flashes of light which strike said aperture.

3. A gunnery training apparatus comprising a target, mechanical means for producing a plurality of light flashes distributed in a conical zone similar to the angular spread of bullets from a gun, said mechanical means being positioned between a continuous light source and said target, and comprising movable shutter means serving to produce light flashes at different radial distances from a common center, light-sensitive means arranged to be responsive to those light flashes which reach said target, and registering means under control of said light-sensitive means to register the light flashes which reach said target.

4. A gunnery training apparatus as claimed in claim 3 wherein said movable shutter means comprises a member provided with holes therethrough for the passage of light, said holes being located at random positions corresponding to the normal distribution law of bullets.

5. A gunnery training apparatus as claimed in claim 4 wherein said movable shutter means additionally includes a disc having a radial slit rotatable in the path of said member to provide an intermittent light path through the holes in said member in order to produce a succession of light flashes within said conical zone in directions corresponding to the normal distribution law of bullets.

6. A gunnery training apparatus as claimed in claim 5 wherein said member provided with holes is a second rotatable disc.

7. A gunnery training apparatus comprising means capable of producing in a given direction of fire a plurality of light flashes projected in directions defining a conical zone, the axis of which coincides with the direction of fire and in which the light flashes are at different radial distances from such axis in a manner representative of the angular spread of bullets from a gun, a unitary target, means supporting said target for movement simulating the movement of an actual target within a representation field, means for relatively moving said target and producing means in simulation of the relative maneuvering of an actual gun and target in the represented field, and light-sensitive means responsive to the light flashes reaching the target during said relative movement, and means controlled by said responsive means to cause a count of the number of such light flashes.

8. A gunnery training apparatus as claimed in claim 7, wherein said target supporting means includes mechanism operable to move said target vertically, and means controlled by electric signals representative of the angle of elevation of a target aircraft from the transverse plane of a gunner's aircraft for controlling the operableness of said mechanism.

9. A gunnery training apparatus as claimed in claim 7, wherein said target supporting means includes mechanism operable to move said target horizontally, and means controlled by electric signals representative of the speed of a target aircraft in a horizontal direction toward and away from a gunner's aircraft for controlling the operableness of said mechanism.

10. A gunnery training apparatus as claimed in claim 7, wherein said target supporting means includes mechanism operable to move said target horizontally, and means controlled by electric signals representative of the angle of train of a target aircraft from the vertical plane of symmetry of a gunner's aircraft for controlling the operableness of said mechanism.

11. A gunnery training apparatus comprising means for producing a plurality of light flashes distributed in a conical zone similar to the angular spread of bullets from a gun, a target, means for obtaining relative movement of the target and means for producing said light flashes whereby relative maneuvering of a gun and a target can be simulated, said means for obtaining such relative movement including a lead-screw on which said target is mounted, an electric motor controlled by electric signals representative of the angle of elevation of a target aircraft from the transverse plane of a gunner's aircraft for driving said lead-screw, said lead-screw being mounted on a second lead-screw controlled by electric signals representative of the speed of said target aircraft in a horizontal direction, and said second lead-screw being mounted upon a third lead-screw controlled by electric signals representative of the angle of train of the target aircraft from the vertical plane of symmetry of the gunner's aircraft, light-sensitive means arranged to be responsive to those light flashes which reach said target, and registering means under control of said light-sensitive means to register the light flashes which reach said target.

References Cited in the file of this patent

UNITED STATES PATENTS

| | | |
|---|---|---|
| 2,131,952 | House | Oct. 4, 1938 |
| 2,287,429 | Hooker et al. | June 23, 1942 |
| 2,406,574 | Waller et al. | Aug. 27, 1946 |
| 2,418,512 | Johnson | Apr. 8, 1947 |
| 2,471,368 | Ekstrom et al. | May 24, 1949 |
| 2,563,777 | Ellison | Aug. 7, 1951 |
| 2,676,419 | Stephens et al. | Apr. 27, 1954 |
| 2,705,769 | Cooper | Apr. 5, 1955 |
| 2,795,057 | Sohn | June 11, 1957 |